Aug. 18, 1970 D. R. VON RECKLINGHAUSEN 3,524,995

LIMITER APPARATUS

Filed July 12, 1967

INVENTOR
DANIEL R. von RECKLINGHAUSEN

BY *Rines and Rines*

ATTORNEYS 3,524,995

LIMITER APPARATUS

Daniel R. von Recklinghausen, Arlington, Mass., assignor to H. H. Scott, Inc., Maynard, Mass., a corporation of Massachusetts Filed July 12, 1967, Ser. No. 652,910
Int. Cl. H03g *3/30;* H03k *5/08*
U.S. Cl. 307—237 8 Claims

ABSTRACT OF THE DISCLOSURE

Transistor amplifier limiting circuits are disclosed in which use is made of the inherent saturation characteristics of the transistor itself to effect negative voltage limiting, and diode means is connected in different select paths to oppose the operating direct-current components with positive instantaneous voltage components in a manner such as to enable the presenting of a high impedance to the emitter of the transistor in the presence of excessive positive voltage limits.

Figure 1:
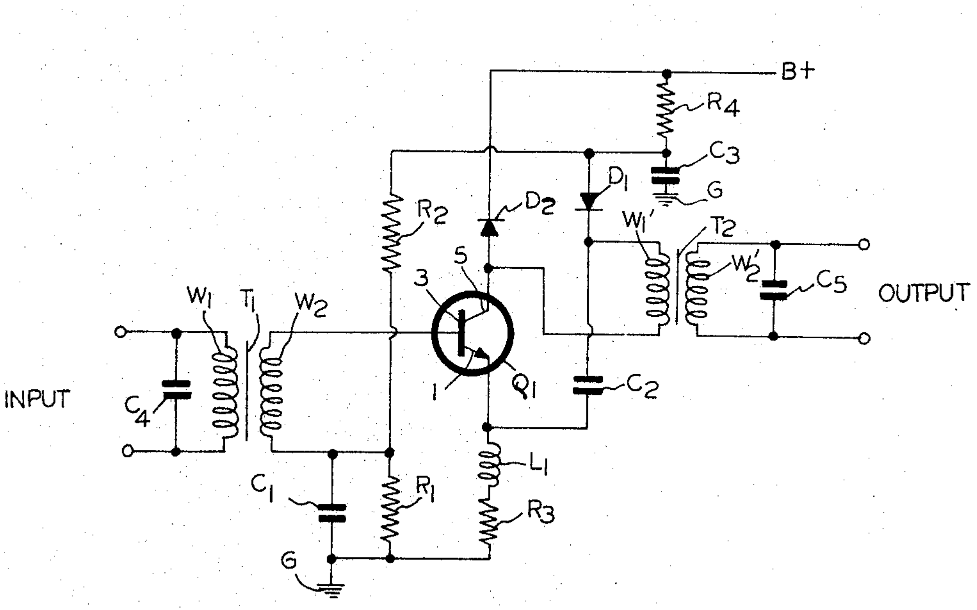

The present invention relates to limiter apparatus and, in particular, to limiter circuits adapted for use in receivers for frequency modulated signals, although the principles of the invention are equally applicable for other purposes requiring the limiting in amplitude of other types of alternating current signals.

For many years, limiter circuits involving pentode tubes and the like have been employed in receivers for frequency modulated signals. The incoming signal produces a grid current flowing through a grid leak resistor, thereby developing a negative bias voltage which reduces the average gain of the tube and ultimately maintains a relatively constant output voltage. The advantage of such a circuit residing in its simplicity, however, has often been outweighed by the disadvantage of limited speed of operation. In such a circuit, the input signal is applied through a coupling capacitor which charges up to a voltage level determined by the voltage drop across the grid leak resistor. A rapid decrease in incoming signal causes the tube to be maintained in the state of low gain, thereby producing a reduced output signal which then increases to a steady state value at a rate determined by the high time constant value of the input coupling capacitor and the grid leak resistor. The instantaneous output voltage, furthermore, is neither sinusoidal nor symmetrical and, therefore, amplitude variations of the input signal are not effectively limited.

In order to overcome the afore-mentioned problems, two tubes have often been used whereby the grid of the first tube receives the incoming signal and the cathode of the second tube is connected to the cathode of the first tube and a common cathode resistor, with the grid of the second tube being grounded. The output signal is obtained from the plate of the second tube. Such circuits are then capable of symmetrical limiting and relatively high speed of operation. Entirely analogous circuits, moreover, have been constructed employing a pair of transistors wherein the collectors perform the function of the anodes or plates. The bases perform the function of grids, and the emitters perform the function of cathodes.

A major disadvantage of such cathode-coupled or emitter-coupled limiter circuits, however, resides in the fact that the amplification for small input signals is only approximately equal to the amplification obtained by a single tube or transistor. A further disadvantage is that reactive loads in the output circuit, such as tuned circuits, may not obtain a symmetrically limited waveform. In its normal manner of operation, the impedance seen at the second plate or collector may be extremely low when the second stage is fully saturated, and may be extremely high when the second stage is cut off.

The object of the present invention, accordingly, is to overcome all of the above-mentioned problems of asymmetrical limiting, relatively high time constants and radically different impedances at the extremes of the output voltage swing, and to do so while employing only a single transistor as the only active device in the circuit.

A further object of the present invention is to provide a new and improved limited circuit for alternating current signals in which the incoming signal will be limited by the circuit in a symmetrical manner once the input signal has exceeded a minimum or threshold value. Furthermore, once this value is exceeded, limiting will be maintained symmetrically; i.e., equal clipping of the positive and negative excursions of the waveform regardless of the impedance of the load circuit. In addition, to this, the speed of limiting or the ability of the circuit to accommodate rapidly varying alternating current signals will be dependent upon only the bandwidth of the input and output circuits connected to the limiter circuit.

An additional object is to provide a novel limiter apparatus of more general utility, also.

Other and further objects are later described, being more fully pointed out in the appended claims.

Figure 2:
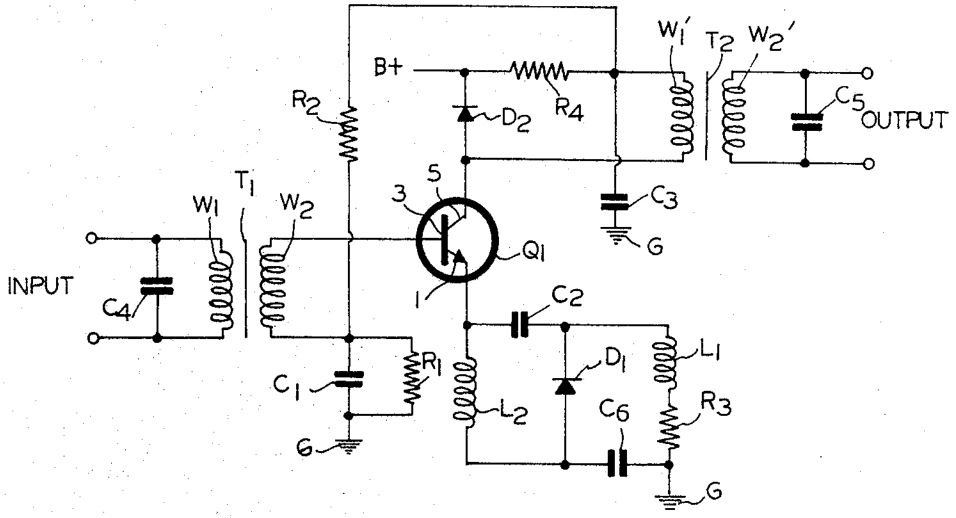

The invention will now be described with reference to the accompanying drawings, FIG. 1 of which is a schematic circuit diagram showing a preferred embodiment, illustratively shown as adapted for FM broadcast receivers; and FIG. 2 is a similar diagram of a modification.

In summary, the limiter apparatus of the invention comprises a transistor provided with base, collector and emitter electrodes, means for applying an alternating current input of predetermined frequency to the base electrode (the negative and positive instantaneous limits of which input are to be controlled), means for supplying operating direct current for the transistor including diode means connected in a first path to pass direct-current components in one direction to the diode means, means for connecting the diode means in a second path with the emitter electrode to pass alternating-current components from the emitter in the opposite direction to the diode means, the transistor itself limiting negative inputs as the base and hence the collector electrodes approach zero instantaneous voltage, and the diode means ceasing conduction in the presence of a positive input exceeding the said positive limit, causing the instantaneous value of the said alternating-current components substantially to equal said direct-current components and presenting a high impedance to the emitter electrode, thereby positively limiting the maximum instantaneous current from the collector electrode. Preferred constructional details are hereinafter set forth.

Referring to FIG. 1, the input signal is obtained from, for example, an FM receiver intermediate-frequency amplifier and is applied to the pair of terminals labeled "Input," being thus applied to the primary winding $W_1$ of transformer $T_1$, the self-inductance of which, together with shunt capacitor $C_4$ forms a resonant circuit tuned to the aforementioned intermediate frequency.

The one active element in this circuit is transistor $Q_1$, shown here as a NPN transistor, having an emitter electrode 1, a base electrode 3 and a collector electrode 5. The input signal is applied to the base electrode 3 from the secondary winding $W_2$ of transformer $T_1$, one end of this winding being effectively grounded for high frequencies by way of capacitor $C_1$ connected to ground terminal G. Operating bias for this transistor $Q_1$ is supplied from the supply voltage B+ by way of resistors $R_4$ and $R_2$, forming a voltage divider with resistor $R_1$. Operating current for transistor $Q_1$ is supplied from the supply voltage B+ by way of resistor $R_4$, a diode $D_1$, and the primary winding $W_1'$ of transformer $T_2$ to the collector electrode 5 of transistor $Q_1$. The sum of base and collector current of transistor $Q_1$, moreover, is equal to the emitter current which is returned to ground G from emitter electrode 1 through inductance $L_1$ and resistor $R_3$ to ground G. Output voltage is obtained from the pair of terminals labeled "Output" from the secondary winding $W_2'$ of transformer $T_2$ which is tuned to the above-mentioned intermediate frequency by resonating its self-inductance with capacitor $C_5$.

When the input signal is relatively small and therefore below the threshold of limiting, transistor $Q_1$ operates as an amplifier. In such mode, the emitter electrode 1 of transistor $Q_1$ is substantially grounded for high frequencies by way of capacitor $C_2$, diode $D_1$, and capacitor $C_3$ connected to ground G from the lower terminal of resistor $R_4$. In order to have effective high frequency bypassing of the emitter electrode 1, capacitors $C_2$ and $C_3$ may be chosen of such value that their impedance is small compared to the emitter impedance of transistor $Q_1$. Since diode $D_1$ carries a direct current equal to the collector current of transistor $Q_1$, and since the emitter current of a transistor is only a little larger than its collector current, diode $D_1$ can be thought of as carrying a direct current substantially equal to the emitter current of transistor $Q_1$. The small alternating signal impedance of diode $D_1$, therefore, is substantially equal to the small-signal alternating-current emitter impedance of transistor $Q_1$. If the impedance of capacitors $C_2$ and $C_3$ are effectively short-circuited at the input frequency, the effective total emitter impedance of this circuit is substantially twice the impedance of the value which would be found when effectively grounding emitter terminal 1 for high-frequency signals.

Since the base input impedance of a transistor is equal to its emitter impedance multiplied by the current gain of the transistor, the effective input impedance of $Q_1$ in the circuit of FIG. 1 is equal to approximately twice its normal base input impedance. The effective current gain of $Q_1$, however, has not changed; but twice the normal input voltage will be required, thereby reducing the power gain by only a factor of approximately two. This is a considerably smaller loss in gain than that experienced by using two-stage emitter-coupled limiter circuits, before discussed.

The ability of a limiter circuit to amplify small signals without affecting the relative waveform is only an incidental, but necessary, function of a limiter circuit. A small signal analysis of the above nature is still necessary to determine the stage gain prior to the onset of limiting. By its very nature and design, a limiter circuit has to operate in a non-linear fashion and with large signals. It now remains to be shown how this circuit performs limiting.

If the instantaneous voltage developed across the secondary winding $W_2$ of input transformer $T_1$ reaches a predetermined nagative limit value, the point will be reached where base electrode 3 of transistor $Q_1$ approaches an instantaneous voltage equal to zero with respect to the emitter electrode 1; and at this point, and any further negative values, the base current remains at essentially zero value. Neglecting leakage, the collector current of the transistor $Q_1$ will also be equal to zero and, therefore, the output current is limited in the direction towards negative instantaneous input signals.

If the instantaneous input voltage across the secondary winding $W_2$ of transformer $T_1$ increases in the positive direction, the instantaneous component of the emitter current of transistor $Q_1$ increases, flowing by way of a path containing capacitors $C_2$ and $C_3$ to diode $D_1$, but in an opposite direction to the direct-current component which flows from the supply voltage B+ by way of a second path comprising resistor $R_4$, diode $D_1$, primary winding $W_1'$ of transformer $T_2$ to the collector electrode 5 of $Q_1$. Eventually, upon further positive increase of the input voltage, a limit point will be reached where the direct current through diode $D_1$ and the instantaneous alternating component of current through diode $D_1$ are equal, but of opposite polarity. At this point, and upon any further increase in voltage across the secondary winding $W_2$ of transformer $T_1$, diode $D_1$ will cease to conduct, presenting a high impedance to the emitter electrode 1 of transistor $Q_1$. The effective emitter impedance then will become very high because inductance $L_1$ is chosen to be of high impedance at the desired frequency of operation, and, preferably, self-resonant at that frequency.

Any further increase in instantaneous input voltage will therefore change the base current of transistor $Q_1$ only insignificantly, but will raise its instantaneous emitter voltage. The maximum instantaneous current from collector electrode 5, therefore, is effectively limited, and diode $D_1$ and capacitor $C_2$, along with inductance $L_1$, perform the function of current-limiting in the direction of positive input signals, with the transistor $Q_1$ itself performing the function of limiting in the direction of negative input signals.

If the impedance of transformer $T_2$ and the impedance connected to the output, as seen from the collector terminal 5 of transistor $Q_1$, are equal to or less than the normal impedance for maximum power output, no further limiting circuitry is required. As is known, the normal impedance for maximum power output of a transformer-coupled Class A amplifier is approximately equal to the ratio of DC collector-to-emitter voltage divided by the direct collector current.

The circuit connected to the "output," or transformer $T_2$ by itself, may have an impedance level at certain frequencies which might be substantially above the aforementioned normal impedance. This could be the case, for example, if the transformer $T_2$ is a portion of a discriminator or ratio detector circuit, or if the output is connected to further stages of limiting, similar or different from that shown in FIG. 1. If such a high impedance load should exist, the instantaneous output voltage may not be symmetrically limited because the collector 5 of transistor $Q_1$ will present an unequal impedance throughout a complete cycle of the input voltage waveform. Referring again to FIG. 1, but replacing diode $D_1$ by a short-circuit connection and imagining transformer $T_2$ to be of very high impedance, any instantaneous increase in the base current of transistor $Q_1$, and therefore instantaneous base voltage, will therefore result in an instantaneous voltage of opposite polarity at the collector electrode 5. If the instantaneous base voltage of transistor $Q_1$ has reached such a point where the effective collector-to-emitter voltage of transistor $Q_1$ approaches a value near zero, the transistor is in effort operating in saturation and presents a very low instantaneous impedance. This, in effect, limits the output voltage of transistor $Q_1$ in the direction of instantaneous negative voltage swings.

If the instantaneous input voltage goes in the negative direction, the collector impedance of transistor $Q_1$ remains at its normal high value, and an instantaneous voltage across the primary winding $W_1'$ of transformer $T_2$ could be developed, which is in excess of that obtained for negative instantaneous outputs. This is an effect desired in certain sweep circuits where high instantaneous output voltages are desired. In a limiter circuit, moreover, it is desirable that the instantaneous positive and negative instantaneous output voltages are approximately equal. For this reason, a second limiting diode $D_2$ is shown connected between the collector electrode 5 and the supply voltage source B+. The diode $D_2$ is normally reverse biased and therefore non-conducting. The value of resistor $R_4$, furthermore, is chosen so that the difference in potential across resistor $R_4$ is approximately equal to the collector-emitter voltage of transistor $Q_1$ under no-signal conditions.

Should the instantaneous input voltage reduce the base current and therefore the collector current of transistor $Q_1$ to such a value where the instantaneous collector voltage is beginning to exceed the supply voltage B+, diode $D_2$ will conduct and present an instantaneous low impedance, thus limiting the instantaneous positive voltage on collector $Q_5$ to a value substantially equal to the supply voltage B+ and accordingly limiting the instantaneous positive voltage swing. As mentioned above, the transistor itself, through its saturation impedance at low instantaneous collector-emitter voltage, limits the output voltage swing in the negative direction.

By a suitable choice of the resistor $R_4$, any desired degree of symmetry or asymmetry in limiting can be obtained when and if the impedance of transformer $T_2$ and a load impedance connected to the output are equal to or above the normal impedance of the collector circuit. It can be seen, therefore, that diodes $D_1$ and $D_2$, with their associated components, and transistor $Q_1$ in the circuit just described, are capable of limiting the output signal regardless of the impedance of the output circuit.

In accordance with the invention, therefore, use is made of the fact that the impedance of a transistor in its normal conducting mode, as seen from the emitter terminal, is that of a semi-conductor diode operated with substantially the same direct current flowing through both diode and emitter. Use is also made of the fact that the impedance of the collector of a transistor is relatively high when operated in its normal conducting mode and relatively low when operated in saturation at low instantaneous collector-to-emitter voltages, and therefore behaves analogously to a diode connected to a reference potential. Here, the diode is rendered substatnially non-conductive until the instantaneous voltage exceeds the aforementioned reference potential. Though solid-state diode devices $D_1$ and $D_2$ are illustrated, it is to be understood that other types of non-linear elements or switching devices that can perform substantially the same function may also be employed, all such being sometimes generically referred to herein as "diodes" or "diode means."

It is not necessary, however, to perform the function of current-limiting by having diode $D_1$ in effect connected in the DC path of the collector circuit. FIG. 2 shows an alternate connection of diode $D_1$, but its function and performance are entirely analogous to the system of FIG. 1. In FIG. 2, the emitter current for emitter electrode 1 of transistor $Q_1$ is returned by way of the path comprising inductance $L_2$, diode $D_1$, inductance $L_1$, and resistor $R_3$ to ground G, thereby establishing the effective diode impedance. Instantaneous emitter current is returned by way of the second path comprising capacitor $C_2$, diode $D_1$, and capacitor $C_6$ to ground G. Any instantaneous increase in emitter current will therefore travel in the opposite direction to the direct current component through diode $D_1$. When the direct and instantaneous emitter-current components are equal, diode $D_1$ will cease to conduct and therefore present a high emitter impedance, and therefore will restrict any further instantaneous amplification of the input signal, thereby causing limiting for positive currents. The limiting of currents in opposite direction or voltage limiting is identical to that described for the circuit of FIG. 1. In both of the circuits of FIGS. 1 and 2, resistor $R_3$ is used to establish the normal emitter current of transistor $Q_1$ and to account for manufacturing variations in transistor $Q_1$.

The limiter apparatus of the invention, therefore, permits the construction of high performance limiters having a high small-signal gain, and therefore effective limiting for large input signals, by employing only a single transistor per stage of limiting. Since the limiting is virtually instantaneous, being limited only by the speed of the transistor and diodes involved, the effective bandwidth of the limiter circuit is therefore restricted only by the effective bandwidth of transformers $T_1$ and $T_2$ in conjunction with the impedance of the source and load circuits.

It is not intended to restrict the application of these circuits for the reception of FM broadcasts, because much broader applications are obviously easily accomplished.

Further modifications will also occur to those skilled in the art, and all such are considered to fall within the spirit and scope of the invention defined in the appended claims.

What is claimed is:

1. Apparatus for limiting an alternating-current input within predetermined limits of negative polarity and positive polarity instantaneous signal voltage values, comprising a transistor provided with base, collector and emitter electrodes, means for applying said input to the base electrode, means for supplying direct current for operating the transistor including diode means connected in a first direct current path containing an output circuit connected from said collector electrode to a source of supply voltage to pass said direct current through said output circuit and through the diode means in the forward direction, means for connecting said diode means in a second path with the emitter electrode to pass alternating-current components of the input from the emitter electrode in the opposite direction through the diode means, said last-named means being adjusted such that an input of one polarity exceeding the corresponding limit causes the base electrode to assume substantially zero instantaneous voltage relative to the emitter electrode to effect limiting of said one polarity, while the said diode means ceases conduction in the presence of an input of the opposite polarity exceeding the corresponding limit and when the instantaneous value of the said alternating-current components is substantially equal to said direct current, presenting a high impedance to the emitter electrode, thereby limiting the maximum instantaneous current from the collector electrode.

2. Apparatus as claimed in claim 1 and in which said second path contains capacitance connected from the emitter electrode to the diode means and in which inductance of high impedance at the frequency of said alternating-current input is further connected to the emitter electrode.

3. Apparatus as claimed in claim 1 and in which further diode means, reversely biased with respect to the first-named diode means, is connected between the collector electrode and said voltage source.

4. Apparatus as claimed in claim 1 and in which said input applying means comprises a tuned circuit resonant at the frequency of the alternating-current input and said output circuit comprises a similar tuned circuit to provide an output from the transistor.

5. Apparatus as claimed in claim 1 and in which the said first path also includes the emitter electrode.

6. Apparatus as claimed in claim 5 and in which said first path comprises inductance and the diode means connected with the said emitter electrode.

7. Apparatus as claimed in claim 6 and in which said second path comprises capacitance and the diode means connected with said emitter electrode.

8. Apparatus as claimed in claim 5 and in which further diode means is connected between the said collector electrode and said source of supply voltage.

References Cited

UNITED STATES PATENTS

| | | | |
|---|---|---|---|
| 3,179,819 | 4/1965 | Lockwood | 307—237 XR |
| 3,254,241 | 5/1966 | Rogers et al. | 307—237 |
| 3,309,617 | 3/1967 | Lancaster et al. | 330—29 XR |

DONALD D. FORRER, Primary Examiner

J. ZAZWORSKY, Assistant Examiner

U.S. Cl. X.R.

325—319; 328—171; 330—29